(12) United States Patent
Diachina et al.

(10) Patent No.: US 9,143,988 B2
(45) Date of Patent: *Sep. 22, 2015

(54) SYSTEM AND METHOD OF SUPPORTING PACKET-SWITCHED HANDOVER

(71) Applicant: TELEFONAKTIEBOLAGET L M ERICSSON (PUBL), Stockholm (SE)

(72) Inventors: John Walter Diachina, Garner, NC (US); Jari Vikberg, Jarna (SE); Peter Ostrup, Linkoping (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 236 days.

This patent is subject to a terminal disclaimer.

(21) Appl. No.: 13/713,035

(22) Filed: Dec. 13, 2012

(65) Prior Publication Data

US 2013/0107865 A1    May 2, 2013

Related U.S. Application Data

(63) Continuation of application No. 11/760,868, filed on Jun. 11, 2007, now Pat. No. 8,359,033.

(60) Provisional application No. 60/804,613, filed on Jun. 13, 2006.

(51) Int. Cl.
*H04W 36/00* (2009.01)
*H04W 36/14* (2009.01)

(52) U.S. Cl.
CPC ...... *H04W 36/0022* (2013.01); *H04W 36/0066* (2013.01); *H04W 36/14* (2013.01)

(58) Field of Classification Search
USPC .......... 455/432.1, 433, 435.1, 436–444, 41.2, 455/555; 370/328, 331–334
See application file for complete search history.

(56) References Cited

U.S. PATENT DOCUMENTS 6,285,874 B1    9/2001  Magnusson et al.
2003/0139180 A1 *  7/2003  McIntosh et al. ............. 455/426

(Continued)

FOREIGN PATENT DOCUMENTS

WO    WO 2005/050965 A1    6/2005
WO    WO 2005/081550 A1    9/2005

(Continued)

OTHER PUBLICATIONS

All References Cited in Parent U.S. Appl. No. 11/760,868.

(Continued)

*Primary Examiner* — Dai A Phuong (57) ABSTRACT

A system and method of supporting packet-switched handover of a mobile station (MS) from a GERAN/UTRAN cell to a Generic Access Network (GAN) cell within a GAN. If the MS is within coverage of the GAN cell, the MS registers within the GAN, triggering initiation of the packet-switched handover from the GERAN/UTRAN cell to the GAN cell. A preparation phase is then conducted for executing the packet-switched handover. The preparation phase includes identifying the MS context as part of the preparation phase and activating the GA-PSR TC towards the MS. Next, the packet-switched handover is executed, resulting in the MS switching to GAN mode. The MS then begins transferring packets via the GAN cell. The system and method also supports a packet-switched handover from the GAN cell to the GERAN/UTRAN cell.

13 Claims, 6 Drawing Sheets

(56) References Cited

U.S. PATENT DOCUMENTS

| | | | |
|---|---|---|---|
| 2005/0088999 A1* | 4/2005 | Waylett et al. | 370/338 |
| 2005/0122941 A1* | 6/2005 | Wu et al. | 370/338 |
| 2006/0114871 A1 | 6/2006 | Buckley et al. | |
| 2006/0121935 A1 | 6/2006 | Dalsgaard et al. | |
| 2006/0146803 A1* | 7/2006 | Bae et al. | 370/352 |
| 2007/0049274 A1* | 3/2007 | Yacobi et al. | 455/436 |
| 2007/0217387 A1* | 9/2007 | Choi et al. | 370/342 |
| 2009/0061879 A9* | 3/2009 | Gallagher et al. | 455/439 |
| 2013/0100839 A1* | 4/2013 | Arora et al. | 370/252 |
| 2014/0269394 A1* | 9/2014 | Magadi Rangaiah et al. | 370/252 |

FOREIGN PATENT DOCUMENTS

| | | |
|---|---|---|
| WO | WO 2005/101890 A1 | 10/2005 |
| WO | WO 2006/056882 A1 | 6/2006 |

OTHER PUBLICATIONS $3^{rd}$ Generation Partnership Project; Technical Specification Group GSM/EDGE, Radio Access Network; Generic access to the A/Gb interface; Stage 2 (release 6). 3GPP TS 43.318 v.6.6.0. (Apr. 2006).

"Work Item for PS Handover Support GAN Mode". 3GPP TSG GERAN #29. Tdoc GP-060979, Agenda item 6.4. Apr. 2006. San Jose Del Cabo, Mexico.

$3^{rd}$ Generation Partnership Project; Technical Specification Group GERAN; Packet-Switched handover for GERAN A/Gb mode; Stage 2 (release 6). 3GPP TS 43.129 v6.8.0 (Jun. 2006).

$3^{rd}$ Generation Partnership Project ; Technical Specification Group GSM/EDGE Radio Access Network; Mobile radio interface layer 3 specification; Radio Resource Control (RRC) protocol (release 7). 3GPP TS 44.018 v7.5.0 (Jul. 2006).

$3^{rd}$ Generation Partnership Project; Technical Specification Group GSM/EDGE, Radio Access Network; General Packet Radio Service (GPRS); Mobile Station (MS)—Base Station (BSS) interface; Radio Link Control/Medium Access Control (RLC/MAC) protocol (release 7). 3GPP TS 44.060 v7.5.0 (Jul. 2006).

Nguyen-Vuong, et al.: "An Architecture for UMTS-WIMAX Interworking". Apr. 2006.

\* cited by examiner

SYSTEM AND METHOD OF SUPPORTING PACKET-SWITCHED HANDOVER

CROSS-REFERENCE TO RELATED APPLICATIONS

This application is a continuation of U.S. application Ser. No. 11/760,868, filed Jun. 11, 2007, which claims the benefit of U.S. Provisional Application No. 60/804,613, filed Jun. 13, 2006, the disclosures of which are hereby incorporated by reference.

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC APPENDIX

Not Applicable

BACKGROUND OF THE INVENTION

This invention relates to communication systems. More particularly, and not by way of limitation, the invention is directed to a system and method of supporting packet-switched handover.

Provisions for packet-switched (PS) handover are included in $3^{rd}$ Generation Partnership Project (3GPP)/GERAN specifications. These provisions allow for PS handover between GPRS/EDGE radio access network (GERAN) and UMTS terrestrial radio access network (UTRAN) cells. PS handover principles are defined in 3GPP TS 43.129 in 3GPP Release-6.

A 3GPP work item, "Evolved UTRA and UTRAN" (E-UTRA and E-UTRAN respectively), defines Long-Term Evolution (LTE), designed to improve efficiency, lower costs and improve services for 3GPP-based access technology. LTE will use Orthogonal Frequency-Division Multiplexing (OFDM) radio technology in the downlink and Single Carrier Frequency Division Multiple Access (SC-FDMA) for the uplink, allowing at least 100 Mbps peak data rate for downlink data rate and 50 Mbps for uplink data rate. LTE radio can operate in different frequency bands and is therefore very flexible for deployment in different regions of the world, where different frequency bands might be licensed.

In addition to the Radio Access Network (RAN) standardization, a 3GPP System Architecture Evolution (SAE) work item is being worked on to develop an evolved core network (CN) for LTE networks. The SAE core network is made up of core nodes, which may be further split into Control Plane (Mobility Management Entity, MME) nodes and User Plane Gateway (Serving Gateway and Packet Data Network (PDN) Gateway) nodes. In this application, the term Access Gateway (AGW) is used to depict both the Serving Gateway and the PDN Gateway nodes and functions. In the terminology currently used, AGW contains both User Plane Entity (UPE) and Inter-Access Anchor (IASA) functionality. The MME is connected to an E-UTRAN NodeB (eNodeB) via a S1-MME interface, and the AGW (i.e. the Serving Gateway) is connected to an eNodeB via an S1-U interface.

Currently, PS handover procedures allow for minimal service interruptions at network-controlled cell change by utilizing the principle of make-before-break meaning that the radio resources in the target cell are allocated before the mobile station (MS) moves to the target cell. In addition, the Location Area Updating (LAU) and Routing Area Updating (RAU) procedures as defined in 3GPP TS 24.008 are performed in parallel with the flow of user plane PS data during the PS handover execution phase to help minimize the interruption to user plane PS data flow experienced during PS handover.

However, currently there are no provisions for PS handover between a GERAN/UTRAN and a Generic Access Network (GAN) cell, between a GERAN and an Enhanced-UTRAN (i.e., LTE) cell, or between a LTE and a GAN cell. Specifically, there are no systems or methods for allowing PS handover between GERAN and GAN cells or between UTRAN and GAN cells or between LTE and GAN cells. Generic Access to the A and Gb interfaces is defined in 3GPP TSs 43.318 and 44.318. Vocabulary for 3GPP specifications is also defined in 3GPP TS 21.905 and is also utilized in the following description.

Without the capability of a PS handover procedure during a cell change to or from a GAN cell, service interruptions are increased and are determined by the time required to first complete the LAU and RAU procedures in the new cell (or relevant other similar procedures for LTE and SAE, for example Tracking Area Updates (TAU)) as well as by the time required to establish the necessary radio resources in the new cell. In the case where the MS also changes SGSN when performing cell change to or from a GAN cell, performing the RAU procedure means that the relevant information for the MS is retrieved from the previous (source) SGSN and forwarded to the new current (i.e., target) SGSN, which further increases the service interruption time. In addition, radio resource establishment time is an issue when a mobile station (MS) moves into a GERAN cell, given the nature of temporary block flow (TBF) establishment procedures.

Additionally, without a PS handover procedure for use during cell change to and from GAN cells, TBFs in a GERAN cell (and Radio Access Bearers (RABs) in a UTRAN cell) would need to be dropped prior to GAN rove-in (where rove-in implies a cell change procedure performed without using the PS handover procedure). The equivalent GAN radio resource, Generic Access-Packet-Switched Resources (GA-PSR) Transport Channel (GA-PSR TC), would then also need to be established after the rove-in, both of which (i.e. dropping of radio resources in the GERAN/UTRAN and allocating radio resources in the GAN cell) would add to the service interruption experienced by active PS services. If voice over IP (VoIP) is supported on one of the TBFs/RABs prior to cell change, then releasing the TBF/RAB prior to rove-in forces Session Initiated Protocol (SIP) signaling to be once again invoked in order to set up the VoIP session after rove-in to the new cell, thereby causing a corresponding delay.

A system and method of supporting PS handover between a GERAN or UTRAN cell or LTE cell and a GAN cell is needed to allow packet data transfer to occur while LAU and RAU procedures are ongoing and to avoid incurring delays in performing SIP signaling after cell change. This is particularly important since GERAN specifications are moving toward fully supporting VoIP service (e.g., with the specification of reduced transmission times and fast acknowledgement/no acknowledgement reporting as part of the Latency Reduction work effort) which makes avoidance of additional SIP signaling in the new cell (i.e. prior to PS service resumption) even more important.

Thus, it would be advantageous to have a system and method of supporting PS handover between GERAN or UTRAN cells and GAN cells. The present invention provides such a system and method.

BRIEF SUMMARY OF THE INVENTION

In one aspect, the present invention is directed to a method of supporting packet-switched handover of a mobile station (MS) from a first cell compatible and located within a first network to a Generic Access Network (GAN) cell compatible and located within a GAN. The method begins by an MS determining if it is within coverage of the GAN cell. Next, the MS registers within the GAN while maintaining full connectivity with the first cell and then triggers an initiation of the packet-switched handover from the first cell to the GAN cell. A preparation phase, which includes the allocation of a GA-PSR TC in the GAN cell, is then conducted prior to executing the packet-switched handover. The PS handover is then executed, and as a result, the MS is then switched to the GAN mode. The MS may then transfer packets via the GAN cell.

In another aspect, the present invention is a system for supporting packet-switched handover of an MS. The system includes a first cell compatible with a first network and the MS operating within the first network. The system also includes a GAN cell within a GAN. The system determines if the MS is within coverage of the GAN cell and registers the MS within the GAN. A trigger is then sent by the MS to initiate a preparation phase for executing the packet-switched handover, thereby activating a GA-PSR TC during the preparation phase. The PS handover is then executed, and as a result, the MS is then switched to a GAN mode. The MS then, upon completion of the preparation phase and switching to GAN mode, begins packet transfer via the GAN cell.

In another aspect, the present invention describes a target node required for supporting packet-switched handover of a MS from a first cell compatible and located within a first network to a GAN cell compatible and located within a GAN. The target node registers the MS (the registration can be MS initiated or network initiated) within the GAN when the MS is within a coverage area of the GAN cell. The target node also receives a handover request from an SGSN as part of the handover preparation phase, identifies the MS associated with the handover request, activates the GA-PSR TC during the preparation phase towards the identified MS and, upon completion of the preparation phase, returns the handover command (as part of the handover request acknowledgement) to the MS via the SGSN that sent the handover request. The target node is a network controller operating within the GAN and supports the handover from the first cell to the GAN cell.

In still another aspect, the present invention is a method of supporting packet-switched handover of an MS from a GAN cell compatible and located within a GAN to a second cell compatible and located within a second network. The method begins by determining that the quality of the current GAN cell is deteriorating and that the MS is within coverage of the second cell. This determination may take place locally in the MS and/or be assisted by the GAN network. Next, the MS triggers an initiation of the packet-switched handover from the GAN cell to the second cell via the Generic Access Network Controller (GANC). A preparation phase is then conducted prior to executing the packet-switched handover to ensure packet radio resources are available and reserved for the MS in the second cell. The MS is then switched to a mode compatible with the second cell. The MS may then transfer packets via the second cell using the packet radio resources reserved during the preparation phase.

In another aspect, the present invention is a system for supporting packet-switched handover of a MS. The system includes a GAN cell compatible and located within a GAN network and the MS operating within the GAN network. The system also includes a second cell compatible and located within a second network. The system determines that the quality of the current GAN cell is deteriorating and that the MS is within coverage of the second cell. A trigger is sent by the MS to initiate the packet-switched handover from the GAN cell to the second cell. A preparation phase is then conducted prior to executing the packet-switched handover to ensure packet radio resources are available and reserved for the MS in the second cell. The MS is then switched to a mode compatible with the second network. The MS then transfers packets via the second cell using the packet radio resources reserved during the preparation phase.

BRIEF DESCRIPTION OF THE SEVERAL VIEWS OF THE DRAWING

In the following, the features of the invention will be described in detail by showing preferred embodiments, with reference to the attached figures in which.

DETAILED DESCRIPTION OF THE INVENTION

Figure 1:
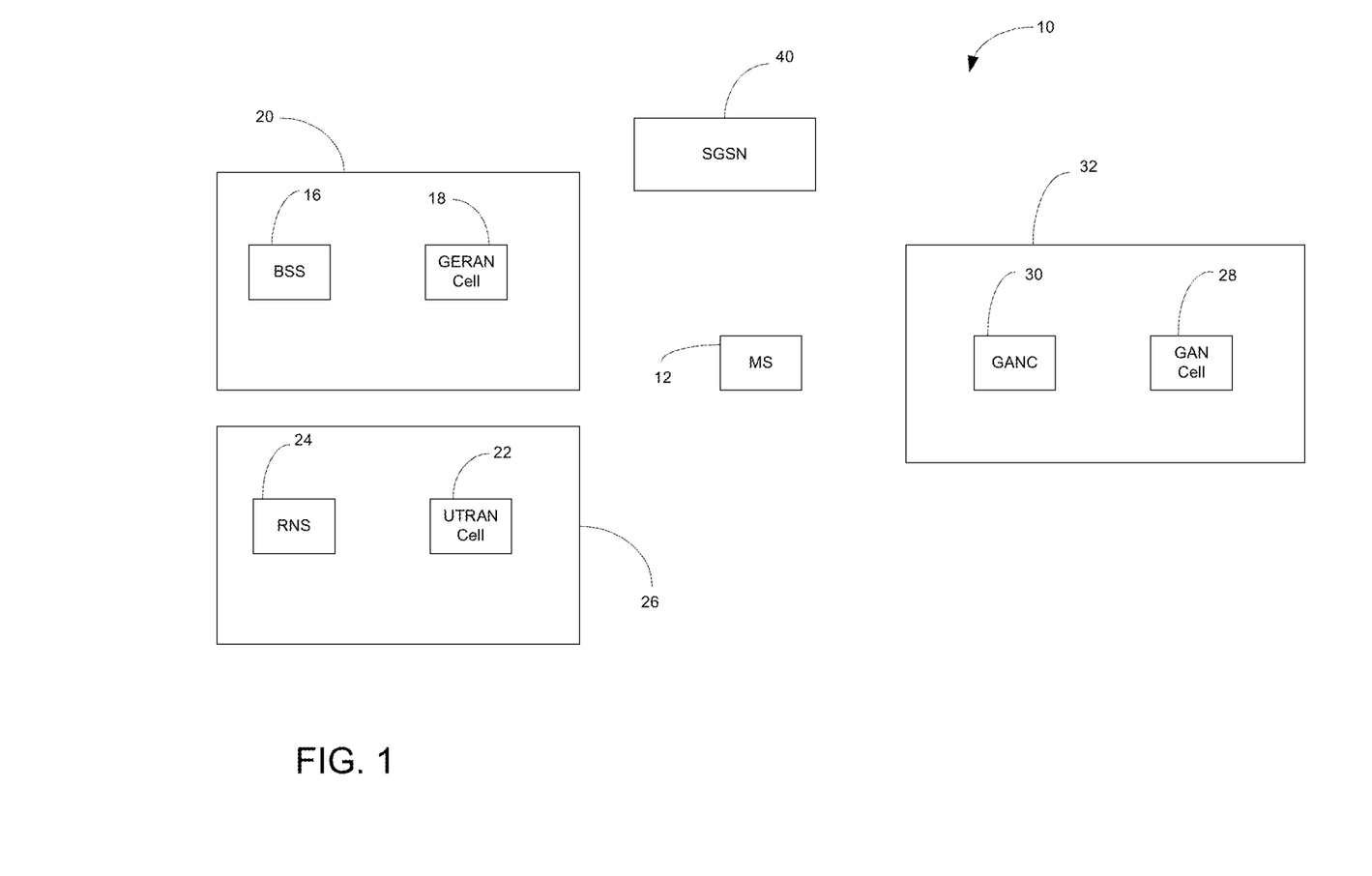
FIG. 1 is a simplified block diagram of a telecommunications system in the preferred embodiment of the present invention.

The present invention is a system and method of supporting PS handover between a GERAN or a UTRAN cell and a GAN cell. FIG. 1 is a simplified block diagram of a telecommunications system 10 in the preferred embodiment of the present invention. Existing mobile networks logically divide the infrastructure into a Core Network and an Access Network. The basic Core Network includes circuit-switched nodes, such as Mobile Switching Centers (MSCs), packet-switched nodes, such as General Packet Radio Service support nodes (SGSNs) and other control and/or database nodes, such as Home Location Registers (HLRs). The basic Access Network includes radio control nodes and radio access nodes. The radio control nodes may include Base Station Controllers (BSCs) for GSM (Global System for Mobile Communications) radio networks and Radio Network Controllers (RNCs) for UMTS (Universal Mobile Telecommunications System) radio networks. In addition, the radio access nodes may be Base Transceiver Stations (BTSs) for GSM radio networks and Node Bs for UMTS radio networks. The combination of BSCs and BTSs is called Base Station Subsystem (BSS) for GSM networks and the combination of RNCs and Node Bs is called Radio Network Subsystem (RNS) for UMTS networks. Referring to FIG. 1, the telecommunications system includes a mobile station 12 operating in the telecommunications system 10. The system includes a BSS 16 and a GERAN cell 18 within a GERAN 20. The network also includes a UTRAN cell 22 and a RNS 24 within a UTRAN 26. A GAN cell 28 and a Generic Access Network Controller (GANC) 30 operate within a GAN 32. In addition, the telecommunication system includes a SGSN 40. For simplicity, only components relevant to the PS handover procedure are discussed, but it should be understood that the telecommunication system may utilize other components.

In a first embodiment, a PS handover is conducted from either the GERAN cell 18 or the UTRAN cell 22 to the GAN cell 28. The mobile station is active in conducting one or more packet data sessions in either the GERAN cell or the UTRAN cell. The MS utilizes neighbor cell list information for measurement reporting purposes prior to the MS detecting entry into a GAN coverage area of the GAN cell 28. Next, the MS detects the presence of GAN coverage and performs a GAN registration procedure. The MS 12 then receives the Absolute Radio Frequency Channel Number (ARFCN) and the Base transceiver station Identity Code (BSIC) of the corresponding GANC 30 as defined in 3GPP TS 43.318 and 44.318. As part of the GAN registration process, the GANC 30 stores an MS context for each MS that is successfully registered. The MS context contains information reported by the MS during GAN Registration, such as the MS IP address and the MS Transmission Control Protocol (TCP) connection identifier (socket). In addition, the International Mobile Subscriber Identity (IMSI) is used as the main identifier to find a correct MS context.

If the ARFCN of the GANC 30 for which GAN registration was successfully performed is included in the neighbor cell list of the current GERAN cell 18 or the UTRAN cell 22, the MS 12 begins sending measurements for the ARFCN corresponding to the GAN cell 28. The MS 12 may then report an RXLev of 63 as defined in 3GPP TS 43.318 and 44.318.

By sending measurements that include the ARFCN corresponding to the GAN cell, it may be considered as implicitly indicating that the MS supports PS handover to a GAN cell 28. Thus, it may not be necessary to modify the MS Radio Access Capability (RAC) IE to explicitly indicate MS support for PS handover from a GERAN cell 18 to a GAN cell 28. Transmission of the measurements that include the ARFCN corresponding to the GAN cell 28 may also indicate that the MS 12 desires a PS handover to the corresponding GAN cell 28.

If the BSS 16 or the RNS 24 knows that a specific ARFCN corresponds to a GAN cell, the MS may then send the network a measurement report that indicates an RXLev of 63 for that ARFCN implicitly indicating it supports PS handover to a GAN cell 28 (i.e. an MS that supports PS Handover to GAN can explicitly avoid indicating an RxLev of 63 for all measurement reports except those corresponding to a GAN cell). Since in this case the BSS/RNS knows that the reported ARFCN corresponds to a GAN cell, it will then know that PS Handover can be used to accomplish cell change instead of legacy methods such as sending the MS a Packet Cell Change Order. If the BSS 16/RNS 24 does not know that a specific ARFCN corresponds to a GAN cell, the MS sending a measurement report to the network that indicates that an RXLev of 63 for that ARFCN is still sufficient to implicitly indicate that the MS supports PS handover to GAN. This can be accomplished because an MS that supports PS handover to a GAN cell may be required to only send the network a measurement report that indicates an RXLev of 63 for an ARFCN that it has determined to be associated with GAN service (i.e. the MS never indicates an RXLev of 63 for non-GAN neighbor cells). In this case, a BSS/RNS that supports PS Handover to GAN will therefore view the reporting MS as either a non-GAN PS Handover capable MS indicating an RxLev of 63 for a GERAN neighbor cell or a GAN PS Handover capable MS indicating an RxLev of 63 for a GAN neighbor cell. However, if there is a lack of available system information for the reported neighbor cell, the BSS/RNS may conclude/deduce that it is a GAN neighbor cell (i.e., the BSS/RNS never needs to send the MS system information corresponding to a GAN neighbor cell 28, since the MS acquires the corresponding system information during GAN registration). As such, once the BSS/RNS has concluded/deduced that the reported ARFCN corresponds to a GAN cell, the BSS/RNS then knows that PS Handover can be used to accomplish cell change instead of legacy methods, such as sending the MS a Packet Cell Change Order.

Alternatively, rather than sending a measurement report to trigger PS Handover to the GAN cell, a new PACCH message may be sent from the MS 12 to the BSS 16 or a new Radio Resource Control (RRC) message may be sent from the MS 12 to the RNS 24 where both messages would include the ARFCN corresponding to the GAN cell. PS handover from the GERAN cell 18 or the UTRAN cell 22 to the GAN cell 28 therefore requires that the MS be in a packet transfer mode (while in a GERAN cell) or be in RRC Connected mode (while in a UTRAN cell) to provide the BSS 16/RNS 24 with a PACCH/Radio Resource Control (RRC) message based indication that it supports PS handover to a GAN cell 28.

Assuming neighbor list (NL) information in the GERAN cell 18 or UTRAN cell 22 does not indicate the presence of a GAN cell 28, but that the MS has discovered an acceptable GAN cell 28 while performing GAN registration, (which indicates a secure tunnel has been established in the GAN cell and authentication has been performed as necessary), the MS may indicate a desire for PS handover to the GAN cell 28 by sending the BSS 16 a newly defined Packet Associated Control Channel (PACCH) message (e.g., a GAN-SERVICE-AVAILABLE message) or a similar RRC message to the RNS 24 on the uplink DCCH. The PACCH message may provide information about the SGSN 40 associated with the GAN cell 28 (e.g., in the form of a Routing Area Identifier), target cell ID, ARFCN corresponding to the GAN cell, etc. so that the PS handover preparation phase can be directed to the intended SGSN 40 and the intended GAN cell 28.

The transmission of such a new PACCH message while the MS is in packet transfer mode may implicitly indicate that the MS is capable of PS handover to the GAN cell and that the MS desires to receive a PS handover to the corresponding GAN cell 28. Similarly, in a situation where the MS is actively sending packet data in a UTRAN cell in RRC Connected mode, it is not necessary to modify the UE multi-mode/multi-RAT (Radio Access Technology) capability Information Element (IE) to explicitly indicate MS support for PS handover from a UTRAN cell to a GAN cell. Instead, the MS sends the RNS a new RRC message (indicating it is capable of PS handover) while it has one or more RABs supporting PS domain services in RRC Connected mode.

A BSS (or RNS) that supports PS Handover to a GAN cell may then initiate the PS handover preparation phase essentially in accordance with the typical legacy PS handover preparation process for the intra-RAT case (GERAN to GERAN) or the inter-RAT case (UTRAN to GERAN). One exception is that the GANC 30 performs a GA-PSR TC activation during the PS handover preparation phase (i.e., while the MS is still in GERAN/UTRAN mode). The GANC 30 sends the MS a GA-PSR-ACTIVATE-UTC-REQ message and receives a GA-PSR-ACTIVATE-UTC-ACK message from the MS during the PS handover preparation phase to prepare the GA-PSR Transport Channel. This is triggered when the GANC receives the PS HANDOVER REQUEST message from the SGSN. As the IMSI is always included in this message, the GANC can identify the MS context (established during GAN registration), the MS IP address, and the TCP connection that relates to the PS Handover preparation phase request and so trigger the GA-PSR TC activation towards the correct MS using that TCP connection. In addition, it is possible that the MS holds two separate radio interfaces and is able to communicate with GERAN or UTRAN and GAN networks simultaneously using these radio interfaces.

Another alternative for the GA-PSR TC activation during the PS handover preparation phase may be utilized and applied when a new PACCH/RRC message is used to trigger the PS HANDOVER from the GERAN cell 18/UTRAN cell 22 to the GAN cell 28. Specifically, the MS 12 may register with the GANC 30 prior to sending the new PACCH message (on the GERAN radio interface) or new RRC message (on the UTRAN radio interface) to indicate the preference to trigger PS handover to the corresponding GAN cell. The MS may then reserve the local side of the GA-PSR TC (i.e. an UDP-port to be used) and includes the reserved identifier (e.g. UDP-port) in the new PACCH message/RRC message that it sends to the BSS/RNS. The BSS 16/RNS 24 then triggers the PS handover preparation phase essentially in accordance with the existing legacy PS handover preparation phase with one exception. The identifier which is locally reserved by the MS and received by the BSS/RNS in the new PACCH message/RRC message (e.g. UDP-port) is also included in the Base Station Subsystem GPRS Protocol (BSSGP) PS HANDOVER REQUIRED message/Radio Access Network Application Part (RANAP) Relocation Required message which the BSS/RNS sends to trigger the PS handover preparation phase while the MS is in the coverage area of a GERAN/UTRAN cell. This message is sent from the source BSS 16/RNS 24 to the SGSN handling the GANC 30. The GANC 30 then receives the PS HANDOVER REQUEST message and, as the IMSI is always included in this message, the GANC can then identify the MS context (established during GAN registration) and MS IP address that relates to the PS Handover preparation phase request. The locally reserved identifier initially received by the source BSS 16/RNS 24 in the new PACCH message/RRC message (e.g. UDP-port) is also received by the GANC 30 in the PS HANDOVER REQUEST message. At this stage, the GANC is aware of both the IP address (retrieved from the MS context) and the UDP port (received in the PS HANDOVER REQUEST message) to be used for the GA-PSR TC.

In this alternate embodiment, rather than performing the GA-PSR TC activation towards the MS as discussed above, in this next step, the GANC also reserves the local identifiers for the GA-PSR TC which are sent to the MS by including them in the GAN PS HO COMMAND message that is returned to the MS during the PS handover preparation phase. The GANC includes the GAN PS HO COMMAND message in the PS HANDOVER REQUEST ACKNOWLEDGE message, which is then forwarded to the MS using existing preparation phase procedures. The GAN PS HO COMMAND may be a standard PS Handover Command message as defined in 3GPP TS 44.060 v6.21.0.

Once the MS receives the GAN PS HO COMMAND message via the radio interface of the GERAN cell 18 or UTRAN cell 22, the MS has all the required information for the GA-PSR TC and may start sending data in the GAN cell. As such, the GA-PSR TC activation procedure normally performed via the radio interface of the GAN cell 28 may not be explicitly performed, but rather implicitly performed using the PS handover preparation phase and execution phase procedures when a locally reserved identifier is received by the source BSS 16/RNS 24 in the new PACCH/RRC message (e.g. UDP-port) followed later by the MS receiving the local identifier reserved by the GANC in the GAN PS HO COMMAND message.

The PS handover between GERAN or UTRAN cells and GAN cells is considered as primarily either an intra-RAT PS HO (GERAN to/from GERAN) or an inter-RAT PS HO (UTRAN to/from GERAN) as will be shown by the corresponding stage 2 scenarios when they become available (i.e. they will show that there are differences from PS handover between two GERAN cells).

After completion of the PS handover preparation phase, the PS handover execution phase begins by a PS Handover command being sent to the MS 12 in the GERAN cell 18 or the UTRAN cell 22. The handover command sent to the MS in the GERAN/UTRAN cell does not actually contain a tunneled PS Handover command providing the MS with information unique to GAN mode (except for the case of an implicit GA-PSR TC activation procedure as described above where the PS Handover command would include GAN mode specific information sent to the source BSS (or source RNS) during the PS handover preparation phase). Rather, upon receiving the PS Handover command the MS 12 typically only needs to treat it as an indication that it is to switch to GAN mode and begin using the already activated GA-PSR transport channel. In addition, the MS does not need to acquire system information for the target GAN cell 28 prior to accepting a PS handover command to that cell since the necessary system information has already been obtained by the MS during the GAN registration procedure.

The GANC 30 may use a variety of methods to determine that the PS handover to GAN was successful so that the PS handover execution phase can be completed (i.e. so that the source BSS/RNS can be informed that local PS resources can be released). In one embodiment, a new GA-PSR signaling message such as a "GA-PSR-HANDOVER-COMPLETE" message sent by the MS to inform the GANC of this success condition may be used. In another embodiment, the GANC receives data on the GA-PSR TC established during the particular PS handover for a particular MS.

Figure 2:
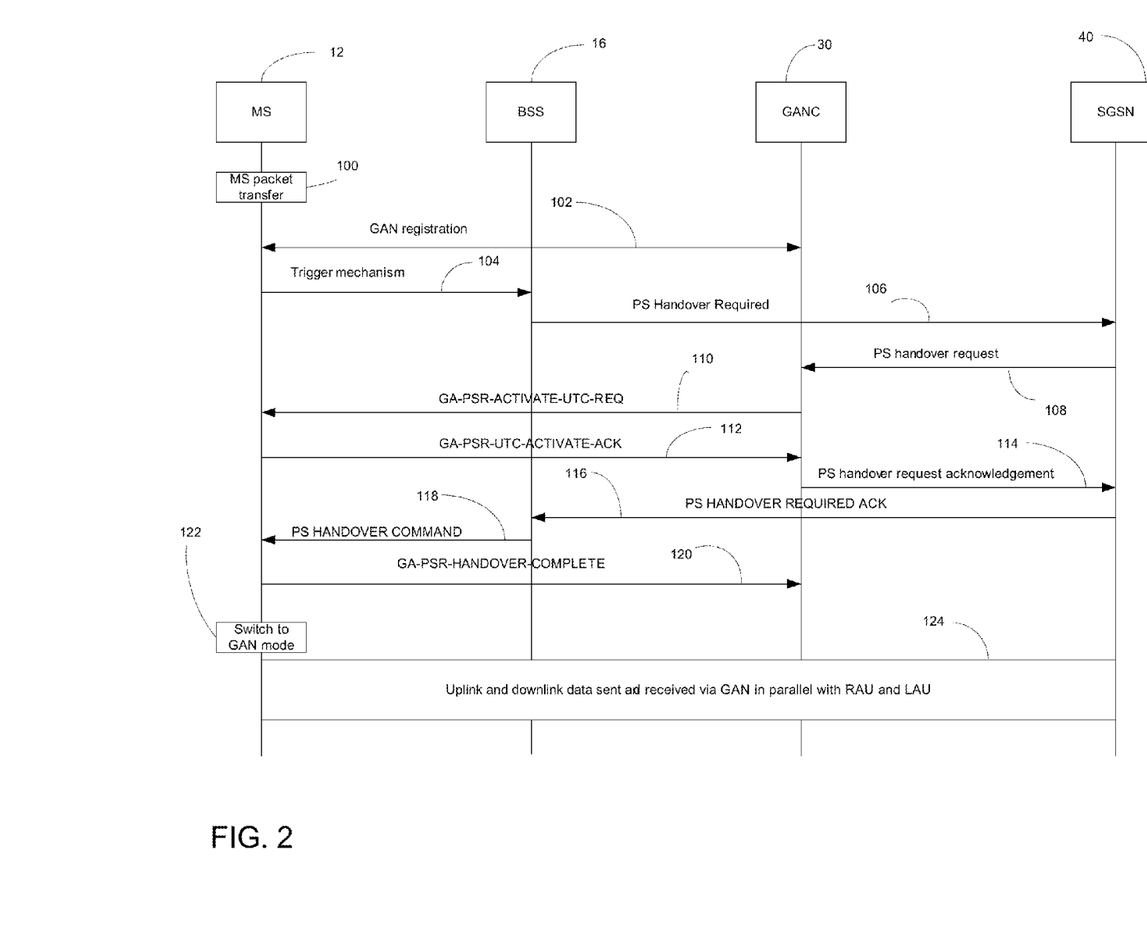
FIG. 2 is a signaling diagram illustrating a PS handover procedure from a GERAN cell to a GAN cell according to the teachings of the present invention.

FIG. 2 is a signaling diagram illustrating a PS handover procedure from a GERAN cell to a GAN cell according to the teachings of the present invention. First, the MS transfers packets at 100 in a GERAN cell 18. Next, GAN registration signaling 102 occurs betweens the GANC 30 and the MS 12. The MS 12 then provides a triggering mechanism to the BSS 16 in 104. The trigger mechanism may be any trigger which informs the BSS 16 that the MS 12 is ready for a handover to a GAN cell 28 as discussed above. Next, in 106, the BSS 16 initiates the PS handover preparation phase by communicating with the SGSN 40. In 108, the SGSN 40 sends a PS handover request to the GANC 30 in accordance with the typical legacy PS handover preparation process for the intra-RAT case (GERAN to GERAN) or the inter-RAT case (UTRAN to GERAN). One exception to typical legacy procedures is that the GANC 30 performs a Generic Access-Packet-switched Resources (GA-PSR) Transport Channel (GA-PSR TC) activation during the PS handover preparation phase (i.e., while the MS is still in GERAN/UTRAN-mode). The GANC 30 sends the MS a GA-PSR-ACTIVATE-UTC-REQ message 110. In turn, the MS sends a GA-PSR-ACTIVATE-UTC-ACK message 112 to the GANC during the preparation phase to confirm allocation of the GA-PSR Transport Channel. The GANC 30 then sends a PS handover request acknowledgement 114 to the SGSN 40.

The SGSN 40 then sends a PS handover required acknowledgement message 116 to the BSS 16. The PS handover is then executed by the BSS 16 sending a PS handover command message 118 to the MS 12. The MS then sends a GA-PSR-HANDOVER-COMPLETE message 120 to the GANC 30 and then switches to GAN mode in 122 In 124, uplink and downlink data is sent and received via the GAN cell 28 in parallel with RAU and LAU. It should be understood that the same signaling diagram may be utilized for a PS handover procedure from a UTRAN cell to a GAN cell.

Figure 3A:
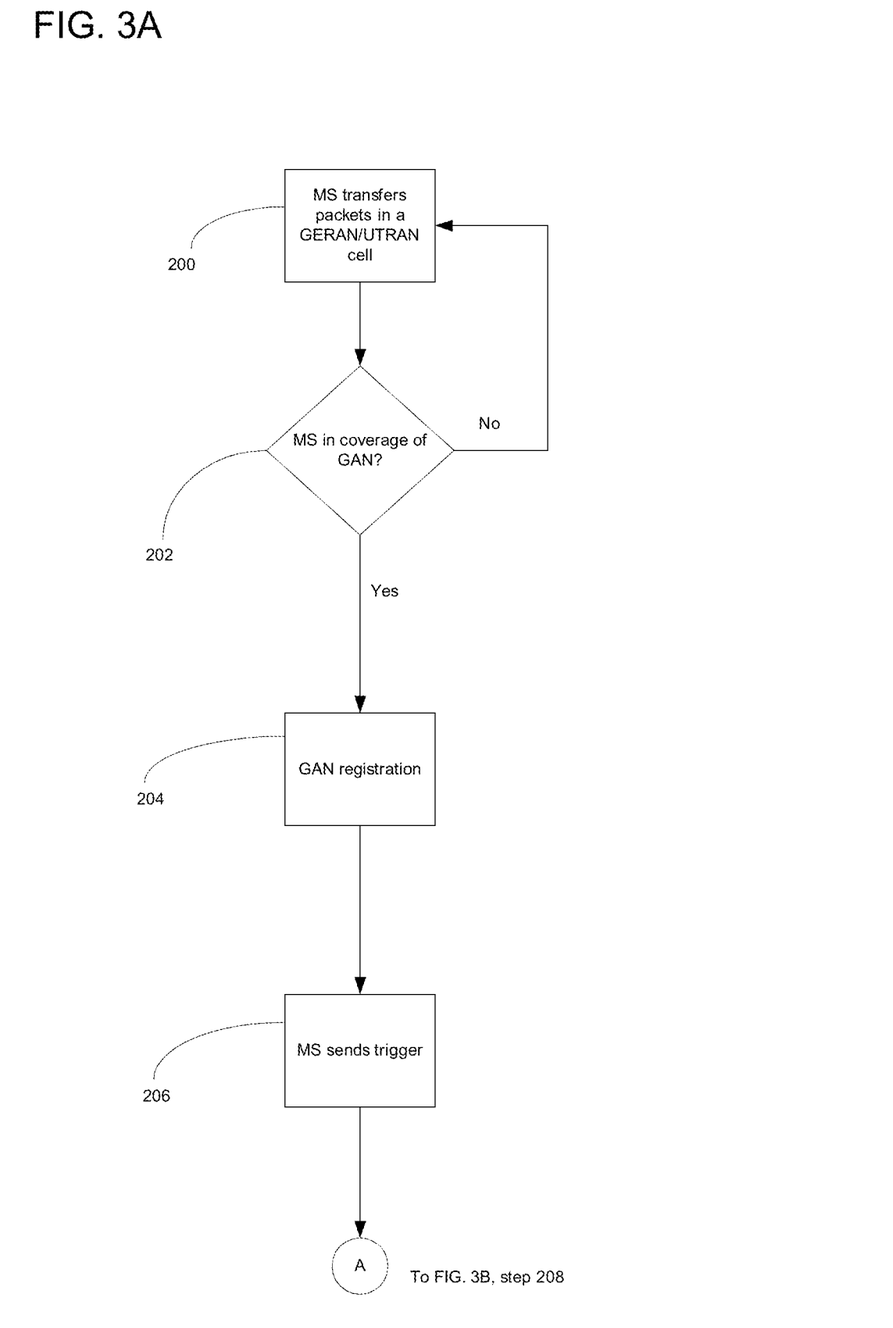
FIGS. 3A and 3B are flow charts illustrating the steps of a PS HO procedure from either a GERAN or an UTRAN cell according to the teachings of the present invention.
Figure 3B:
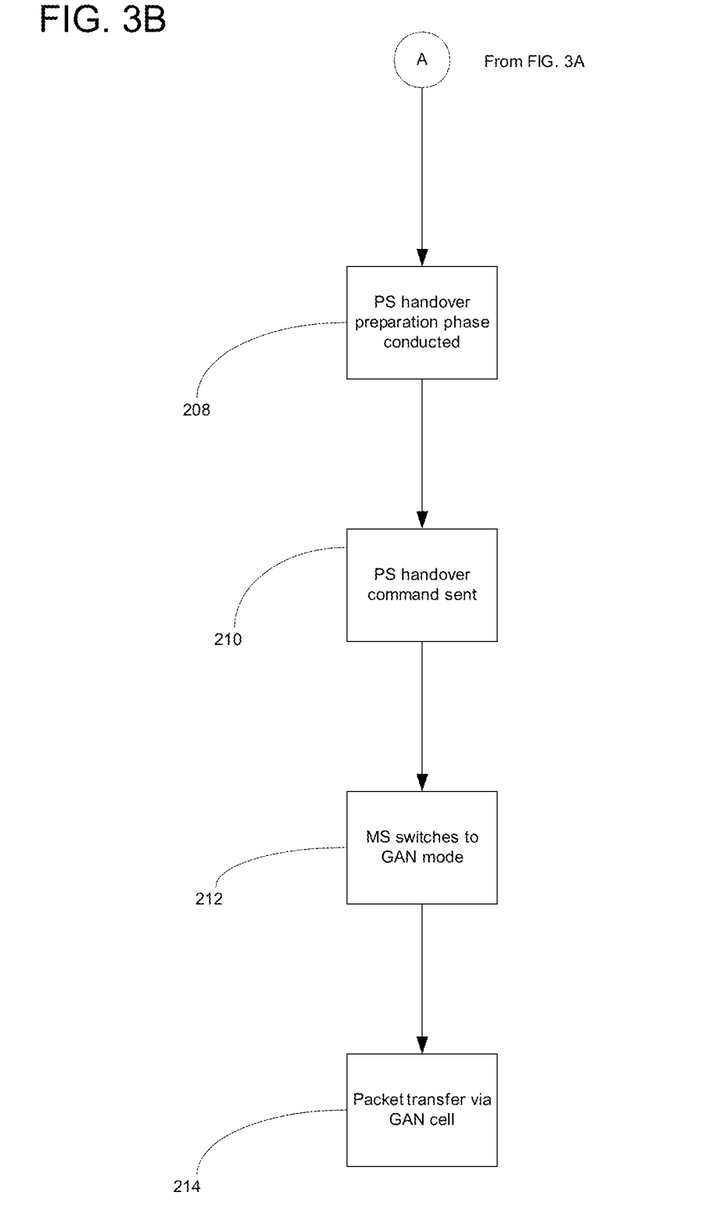

FIGS. 3A and 3B are flow charts illustrating the steps of a PS HO procedure from the GERAN or UTRAN cell according to the teachings of the present invention. With reference to FIGS. 1-3, the method will now be explained. The method may be utilized for either a GERAN cell or a UTRAN cell. The method begins in step 200 where the MS 12 transfers packets in the GERAN cell 18 or the UTRAN cell 22. Next, in step 202, it is determined if the MS detects that it is within coverage of the GAN cell 28. If it is determined that the MS is not within the coverage area of the GAN cell, the method moves to step 200 where the MS 12 continues to transfer packets in the GERAN/UTRAN cell.

However, if it is determined that the MS is within the coverage area of the GAN cell 28, the method moves from step 202 to step 204 where a GAN registration procedure is conducted between the GANC 30 and the MS 12. In step 206, the MS sends a PS handover triggering mechanism to the BSS 16 or RNS 24. The triggering mechanism may be any mechanism to indicate that the MS supports and requests PS handover to a GAN cell. The triggering mechanism may be the transmission of measurements for the ARFCN corresponding to the GAN cell and reporting an RXLEV of 63. By sending measurements which include the ARFCN corresponding to the GAN cell combined with the BSS/RNS ability to detect the nature of the reported cell as described above, the MS is implicitly indicating that the MS supports PS handover to a GAN cell. An alternative trigger mechanism to sending measurements (to trigger BSS/RNS recognition of MS support for PS handover) is to send a new PACCH message/RRC message from the MS to the BSS 16/RNS 24. Upon receipt of the trigger by the BSS 16/RNS 24, the BSC/RNS initiates the PS handover preparation phase in step 208. The preparation phase is similar to the legacy PS handover preparation phase. One exception is that the GANC 30 performs a Generic Access-Packet-switched Resources (GA-PSR) Transport Channel (GA-PSR TC) activation during PS handover preparation phase (i.e., while the MS is still in GERAN/UTRAN-mode). The GANC 30 sends the MS 12 a GA-PSR-ACTIVATE-UTC-REQ message 110. In turn, the MS 12 sends a GA-PSR-ACTIVATE-UTC-ACK message 112 to the GANC during the preparation phase to confirm allocation of the GA-PSR Transport Channel. The GANC 30 then sends a PS handover request acknowledgement 114 to the SGSN 40. The SGSN then sends a PS handover required acknowledgement message 116 to the BSC (a Relocation Command would be sent from the SGSN to the RNC for the case of UTRAN to GAN PS Handover).

The method then moves to step 210 where the PS handover is then executed by the BSC/RNC sending a PS handover command message 118 to the MS 12. In step 212, the MS 12 sends a GA-PSR-HANDOVER-COMPLETE message 122 to the GANC and then switches to the GAN mode. In step 214, uplink and downlink data is sent and received via the GAN cell 28 in parallel with RAU and LAU.

PS handover from a GAN cell to a GERAN/UTRAN cell is similar to the preparation and execution phase as for legacy intra-RAT PS handover (GERAN to GERAN) or legacy inter-RAT PS handover (GERAN to UTRAN). However, there are some differences. During GAN registration, the MS 12 sends the GANC 30 a GA-RC Register Request message that includes the GAN Classmark IE which may be modified to indicate an MS is capable of PS handover from a GAN cell to a GERAN/UTRAN cell. In an alternate embodiment of the present invention, a specific type of GAN measurement information is defined for the PS handover procedure (i.e., compared to the GA-CSR HANDOVER INFORMATION message for CS handover). The GANC 30 may then detect that an MS 12 supports GAN PS handover if the MS 12 sends these new messages to the GANC.

In addition, at any point when a GA-PSR transport channel is active, the GANC 30 may determine that the MS is better served in a GERAN/UTRAN cell and therefore trigger the PS handover procedure if the MS 12 supports PS handover. The GANC may determine this trigger based on measurement information sent by the MS 12 to the GANC 30 while in the GA-PSR ACTIVE state in GAN mode. For example, the GANC 30 may send the MS 12 an explicit GA-PSR signaling message that indicates when the MS should start sending measurement reports providing information about GERAN/UTRAN cells. Alternatively, the MS 12 may perform local measurements and based on these send the measurement reports providing information about GERAN/UTRAN cells to the GANC 30.

A GA-PSR Handover Command message may be sent to the MS in the GAN cell during the execution phase and may then clearly distinguish between the cases of PS handover to GERAN cell and a UTRAN cell since the MS requires a unique way to determine which type of tunneled PS handover command is present in the GA-PSR Handover Command message.

In the case when a PS handover is conducted from a GAN cell to a GERAN cell, the MS may be provided with target cell system information during the PS handover execution phase (e.g., as part of the GA-PSR Handover Command). The GANC may be able to acquire this system information using either Radio Information Management (RIM)/Network Assisted Cell Change (NACC) procedures or using the target BSS to source BSS transparent container sent by the target BSS during the PS handover preparation phase.

Figure 4A:
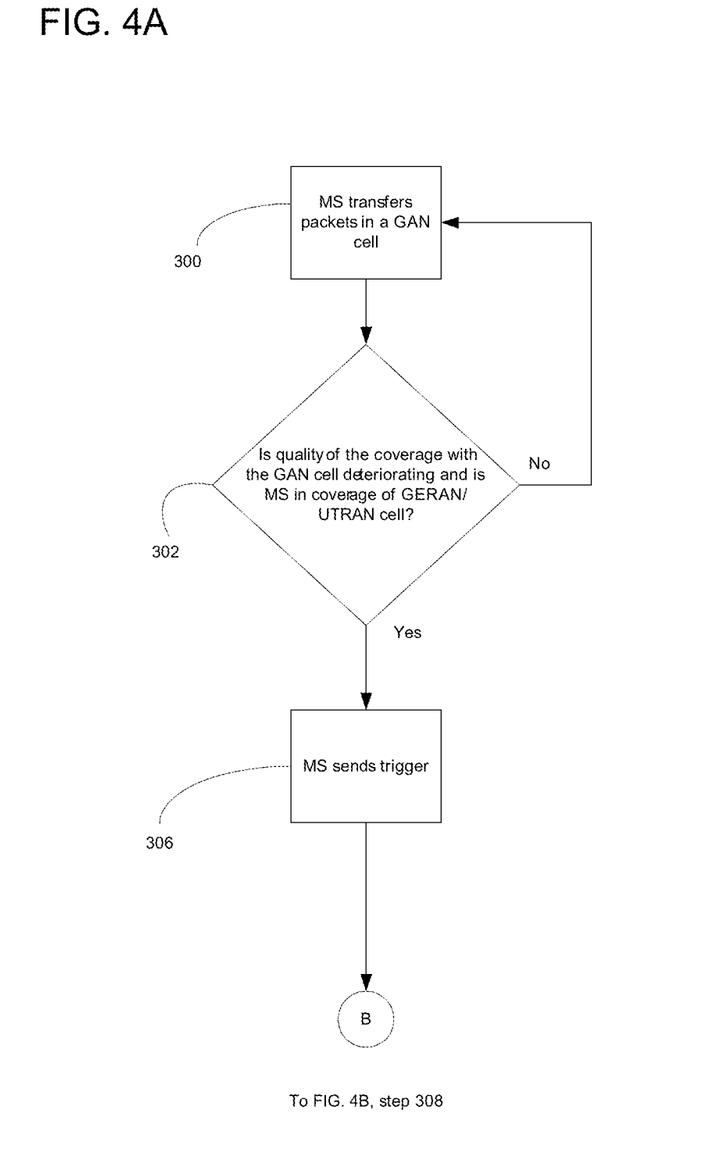
FIGS. 4A and 4B are flow charts illustrating the steps of supporting a PS handover from a GAN cell to either a GERAN or an UTRAN cell according to the teachings of the present invention.
Figure 4B:
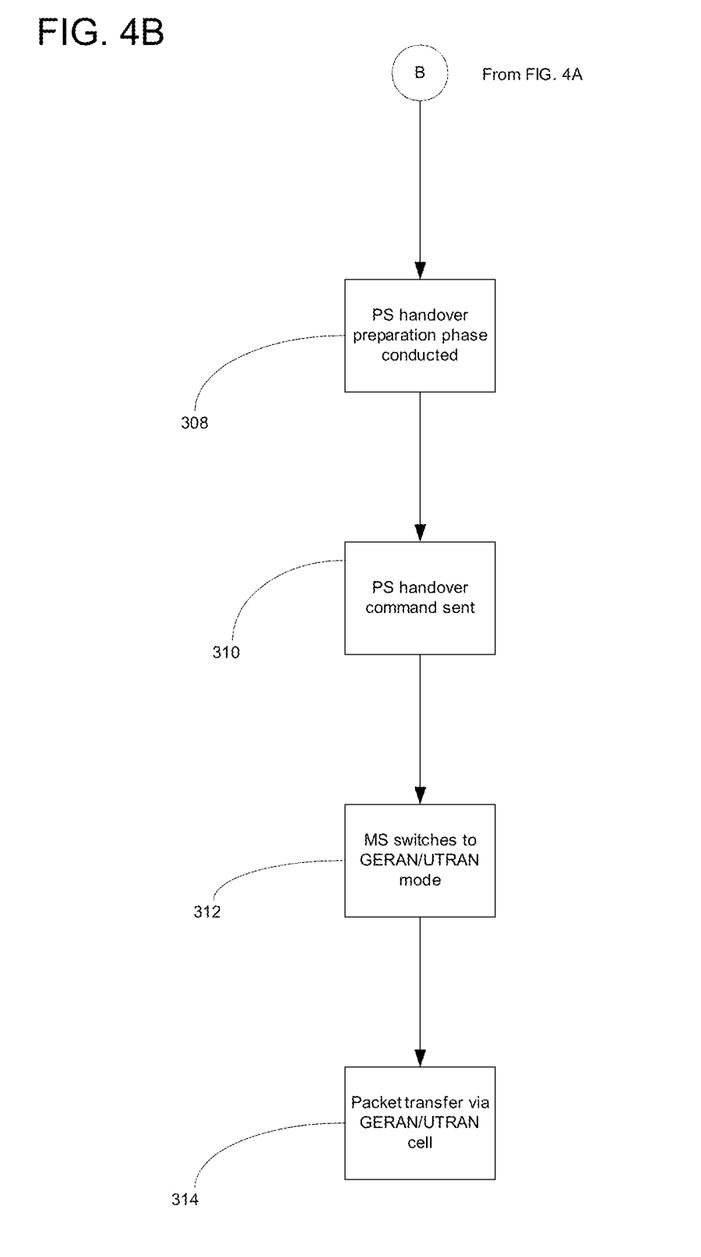

FIGS. 4A and 4B are flow charts illustrating the steps of supporting a PS handover from a GAN cell 28 to either a GERAN cell 18 or an UTRAN cell 22 according to the teachings of the present invention. With reference to FIGS. 1 and 4, the method of the present invention will now be explained. The method begins in step 300 where the MS 12 transfers packets in a GAN cell 28. Next, in step 302, it is determined that the quality of the current GAN cell is deteriorating and that the MS detects that the MS 12 is within the coverage area of either the GERAN cell or the UTRAN cell (or both). If it is determined that the MS 12 is not within the coverage area of the GERAN/UTRAN cell, the method moves to step 300 where the MS 12 continues to transfer packets in the GAN cell 28 as long as possible.

However, if it is determined that the MS 12 is within the coverage area of either the GERAN cell or the UTRAN cell and that the quality of the current GAN cell is deteriorating, the method moves from step 302 to step 306, where the MS 12 sends a triggering mechanism to the GANC 30. The triggering mechanism may be any mechanism to indicate that the MS 12 supports PS handover to a GERAN/UTRAN cell. Upon receipt of the trigger by the GANC 30, the GANC initiates the PS handover preparation phase in step 308. The method then moves to step 310 where the PS handover is then executed by the GANC 30 sending a GAN PS Handover Command message to the MS 12. The MS 12 is preferably provided with target cell system information during the PS handover execution phase (i.e. at least for PS handover from a GAN cell to a GERAN cell). In step 312, the MS 12 switches to GERAN/UTRAN mode. In step 314, uplink and downlink data is sent and received via the GERAN/UTRAN cell in parallel with RAU and LAU.

It should be understood, although the present invention describes support of PS handover between GAN cells and GERAN and UTRAN cells, the present invention may also be utilized with other types of telecommunication systems which encompass other types of radio access networks, such as Advanced Mobile Phone Service (AMPS) system, the Narrowband AMPS system (NAMPS), the Total Access Communication System (TACS), the Personal Digital Cellular (PDC) system, the United States Digital Cellular (USDC) system, code division multiple access (CDMA) system or the E-UTRAN system (also know as a Long Term Evolution system or simply an LTE system).

Although preferred embodiments of the present invention have been illustrated in the accompanying drawings and described in the foregoing Detailed Description, it is understood that the invention is not limited to the embodiments disclosed, but is capable of numerous rearrangements, modifications, and substitutions without departing from the scope of the invention. The specification contemplates all modifications that fall within the scope of the invention defined by the following claims.

What is claimed is:

1. A method of supporting packet-switched handover of a mobile station (MS) from a first cell compatible with a first network to a Generic Access Network (GAN) cell compatible and located within a GAN, the method comprising the steps of:
   receiving an indication that the MS is within coverage of the GAN cell;
   registering the MS within the GAN, wherein the registering further comprises
      creating a MS context and identifying the MS context with an International Mobile Subscriber Identifier (IMSI) associated with the MS;
   triggering initiation of the packet-switched handover from the first cell to the GAN cell;
   conducting a preparation phase for executing the packet-switched handover, wherein
      the step of conducting the preparation phase for executing the packet-switched handover includes identifying the MS context, based on the IMSI associated with the MS, that relates to a packet-switched (PS) Handover preparation phase request and activating a Generic Access-Packet-switched Resources (GA-PSR) Transport Channel from the GAN cell towards the MS;
   sending a handover message to the MS indicating the MS is to switch to the GAN.

2. The method of supporting the packet-switched handover as recited in claim 1, wherein the first cell is a GPRS/EDGE radio access network (GERAN) cell and the first network is a GERAN.

3. The method of supporting the packet-switched handover as recited in claim 1, wherein the first cell is a Long Term Evolution (LTE) cell and the first network is a LTE network.

4. The method of supporting the packet-switched handover as recited in claim 1, wherein the step of triggering initiation of the packet-switched handover includes sending a Packet Associated Control Channel (PACCH) message from the MS to the first network.

5. The method of supporting the packet-switched handover as recited in claim 4, wherein the Packet Associated Control Channel (PACCH) message includes a GAN-SERVICE-AVAILABLE message indicating the MS is ready for packet-switched handover to the GAN cell.

6. The method of supporting the packet-switched handover as recited in claim 1, wherein the first cell is a UMTS terrestrial radio access network (UTRAN) cell and the first network is a UTRAN.

7. The method of supporting the packet-switched handover as recited in claim 1, wherein the step of triggering initiation of the packet-switched handover includes sending a measurement report from the first cell to the first network indicating receipt of a specific Absolute Radio Frequency Channel Number (ARFCN) of a GAN cell, thereby indicating support of packet-switched handover to the GAN cell.

8. The method of supporting the packet-switched handover as recited in claim 1, further comprises the step of sending a packet-switched handover command to the MS.

9. The method of claim 1, wherein a GAN controller activates the Generic Access-Packet-switched Resources (GA-PSR) Transport Channel towards the MS.

10. The method of claim 1, wherein the MS context comprises information reported by the MS during GAN Registration including a MS Internet Protocol (IP) address and the MS Transmission Control Protocol (TCP) connection identifier.

11. A node for supporting packet-switched handover of a mobile station (MS) from a first cell compatible with a first network to a Generic Access Network (GAN) cell compatible within a GAN, the node configured to:
   register the MS within the GAN when the MS is within a coverage area of the GAN cell
   store a MS context and identify the MS context with an International Mobile Subscriber Identifier (IMSI) associated with the MS; and
   receive a packet-switched (PS) handover preparation request, identifying the MS context, based on the IMSI associated with the MS,
   for the PS handover preparation request activate a Generic Access-Packet-switched Resources Transport Channel (GA-PSR TC) from the node towards the MS during a packet-switched (PS) preparation phase and respond to the PS handover preparation request with a PS handover preparation request acknowledgement;
   wherein the node is a network controller operating within the GAN and supporting the handover from the first cell to the GAN cell.

12. The node for supporting the packet-switched handover as recited in claim 11, wherein the node is a Generic Access Network Controller.

13. The node for supporting the packet-switched handover as recited in claim 11, further configured to:
   identify a MS context that relates to a PS Handover preparation phase request; and
   activate a Generic Access-Packet-switched Resources (GA-PSR) Transport Channel towards the MS.

* * * * *

UNITED STATES PATENT AND TRADEMARK OFFICE
CERTIFICATE OF CORRECTION

| | | |
|---|---|---|
| PATENT NO. | : 9,143,988 B2 | Page 1 of 1 |
| APPLICATION NO. | : 13/713035 | |
| DATED | : September 22, 2015 | |
| INVENTOR(S) | : Diachina et al. | |

It is certified that error appears in the above-identified patent and that said Letters Patent is hereby corrected as shown below:

IN THE SPECIFICATION

In Column 1, Line 8, delete "2007, which" and insert -- 2007, now Pat. No. 8,359,033, which --, therefor.

In Column 11, Line 11, delete "know" and insert -- known --, therefor.

IN THE CLAIMS

In Column 12, Line 31, in Claim 11, delete "within" and insert -- with --, therefor.

In Column 12, Line 39, in Claim 11, delete "request, identifying the MS context," and insert -- request identifying the MS context --, therefor.

Signed and Sealed this
Twenty-third Day of February, 2016

Michelle K. Lee
*Director of the United States Patent and Trademark Office*